May 8, 1962 L. D. SOUBIER 3,032,810
METHOD AND APPARATUS FOR FORMING HOLLOW PLASTIC ARTICLES
Filed June 2, 1960 2 Sheets-Sheet 1

INVENTOR.
LEONARD D. SOUBIER
BY W. A. Schaich and
Charles S. Lynch
ATTORNEYS

May 8, 1962 L. D. SOUBIER 3,032,810
METHOD AND APPARATUS FOR FORMING HOLLOW PLASTIC ARTICLES
Filed June 2, 1960 2 Sheets-Sheet 2

INVENTOR.
LEONARD D. SOUBIER

BY W. A. Schmidt and
Charles S. Lynch

ATTORNEYS

United States Patent Office 3,032,810
Patented May 8, 1962

3,032,810
METHOD AND APPARATUS FOR FORMING
HOLLOW PLASTIC ARTICLES
Leonard D. Soubier, Toledo, Ohio, assignor to Owens-Illinois Glass Company, a corporation of Ohio
Filed June 2, 1960, Ser. No. 33,447
7 Claims. (Cl. 18—5)

The present invention relates to a method of and apparatus for making a plastic article and more particularly to a method of and apparatus for making a plastic article by an improved combined injection molding, extrusion and blowing process.

In the manufacture of plastic articles, it has been proposed that articles having portions of critical dimensions, such as bottles requiring accurate finish or neck portions, be manufactured by a process involving the injection molding of the critical part, extruding a tube joined to the injection molded part and then inflating the tube with air to form the remainder of the article.

Such a process and apparatus is illustrated in Sherman Patent 2,804,654, assigned to the assignee of the present invention. In this earlier Sherman patent, the injection mold is brought into registry with an orifice overlying an extrusion chamber communicating with a combined plasticizer-extruder. Within the extrusion chamber is located a power actuated piston for expressing from the chamber and into the injection mold a quantity of material sufficient to form the bottle neck. The injected material is held under the piston pressure until set, the mold withdrawn from the orifice, and orifice-extruder communication is re-established so that a tube is extruded through the orifice as the neck is withdrawn. Finally, a pair of separable mold sections are closed on the tube, and the tube is blown to the contour of the blow mold cavity.

Thus, it will be seen that an injection piston and its actuating parts are necessary for the injection portion of the cycle, resulting in a complicated apparatus particularly where a plurality of articles are to be made simultaneously. Further, the extrusion portion of the cycle must be delayed until after the injection molding and holding portions of the cycle have been completed.

The present invention provides an improved, more simple, faster method of making articles by the same general injection molding, extruding and blowing process disclosed in the Sherman patent. The necessity for a separate injection piston for each mold is eliminated, together with the necessary actuating and control mechanism and a more nearly continuous cycle is obtained.

In essence, the present invention confines a body of plasticized material of predetermined volume in a chamber which is in open communication with the injection mold and utilizes relative mold-chamber movement to substantially reduce the volume of the chamber momentarily to thereby express plastic material under pressure from the confined body of material into the mold. After the mold is filled, the mold and chamber are moved relatively to enlarge the chamber volume with that volume of material in the mold being replaced in the chamber by additional material supplied by the plasticizer-extruder. Further mold-chamber movement separates the mold from the chamber and accommodates the extrusion of a tube integral with material filling the mold and providing the remainder of the article. Later, the tube is enclosed in the blow mold sections and inflated.

It is, therefore, an important object of the present invention to provide an improved method of and apparatus for making a plastic article by a combined injection molding, extrusion and blowing process.

Another object is the provision of a method wherein an injection mold is filled with plasticized material in communication therewith by relative mold-material movement, followed by further mold movement to accommodate the extrusion of an inflatable tube from the body of material.

It is a further object of this invention to provide an improved apparatus for a combined injection molding and extrusion operation and including means defining a chamber of variable volume and wherein a body of plastic material is confined, an injection mold communicating with the chamber and means accommodating relative movement between the mold and the chamber to reduce the volume of the chamber and to force material therefrom into the mold.

Other objects of this invention will appear in the following description and appended claims, reference being had to the accompanying drawings forming a part of this specification wherein like reference characters designate corresponding parts in the several views.

Figure 1:
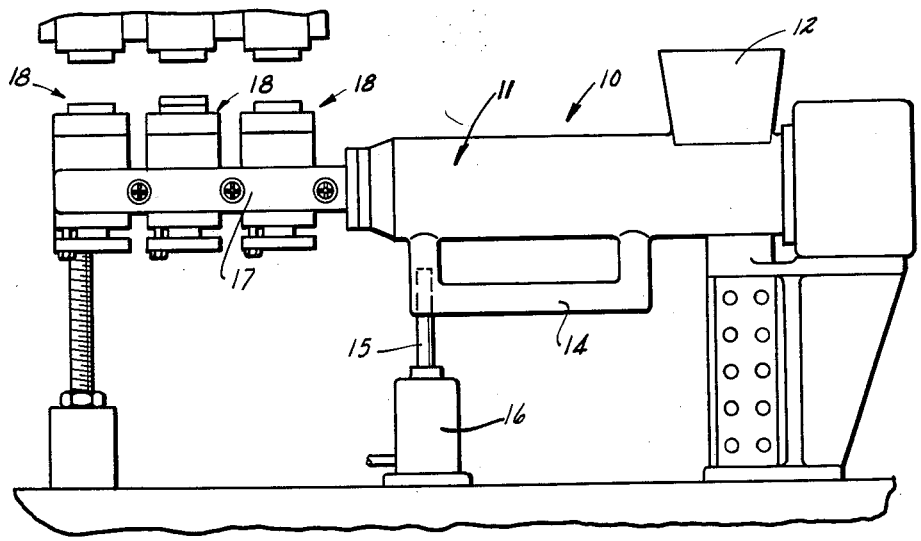
FIG. 1 is a somewhat schematic side elevational view of an apparatus of the present invention capable of carrying out the method of the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As shown in the drawings:

In FIG. 1 reference numeral 10 refers generally to an apparatus of the present invention including a combined plasticizer-extruder 11, preferably of the screw type for receiving solid pelletized plastic material, such as polyethylene in a hopper 12. The plasticizer-extruder 11 is effective to convey the pelletized material from the hopper 12 to the left in FIG. 1, the material issuing from the extruder through an outlet passage 13 (FIG. 2) as a plasticized, substantially fluid mass. The plasticizer-extruder 11 preferably is of the type illustrated in the copending application of Richard C. Allen and Leon E. Elphee, Serial No. 797,276, filed March 4, 1959, and assigned to the assignee of the present invention. Since the plasticized material A is issued only intermittently from the plasticizer-extruder 11, a recirculation passage 14 controlled by the piston rod 15 of a fluid actuated cylinder 16 is preferably provided, all as taught in said Allen and Elphee application above-identified.

As best illustrated in FIG. 1, the passage 13 is provided internally of an elongated conduit 17 and a plurality of forming stations 18 are provided along the length of the conduit 17. Each such forming station 18 is identical to that illustrated in FIG. 2 and only one such station need be described in detail.

Figure 2:
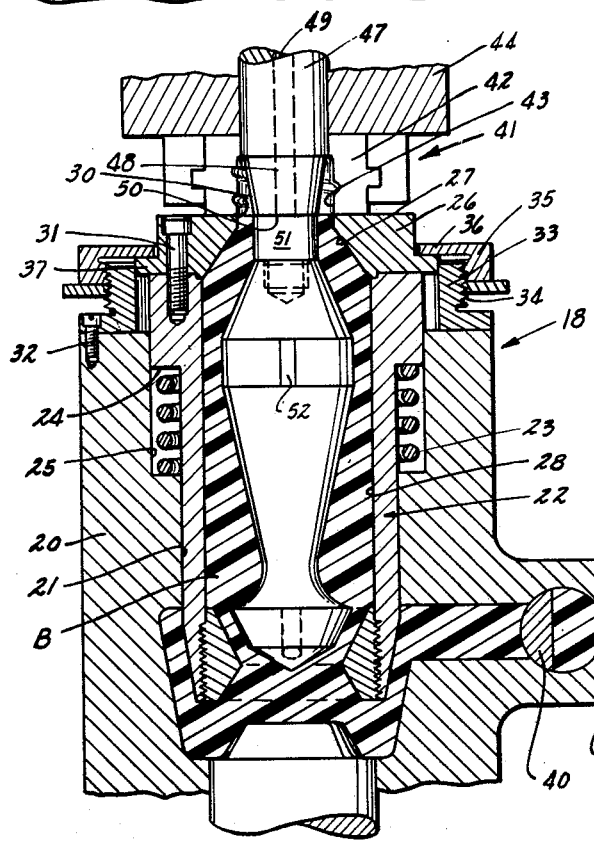
FIG. 2 is a greatly enlarged fragmentary sectional view further illustrating the method and apparatus of the present invention.

As illustrated in FIG. 2, each such station comprises an extrusion block 20 having a vertically extending recess 21 adapted to receive therein a chamber-defining sleeve 22 supported for vertical displacement within the block passage 21 by means of a coil compression spring 23 confined between a radially outwardly projecting shoulder 24 form on the sleeve 22 and the bottom of a counterbored recess 25 formed in the block 20. Superimposed on the sleeve 22 and vertically movable therewith is an orifice block 26 having a central opening 27 therein communicating with the interior bore 28 of the sleeve 22 and providing an orifice 30 of reduced diameter. The orifice block 26 and the sleeve 20 are interconnected by suitable means, as by screws 31.

Seated in the block 20 and secured thereto, as by screws 32, is an adjustment block 33 having exterior peripheral threads 34 concentric with the sleeve. Threaded onto the threads 34 is a positioning nut 35 having an inwardly projecting abutment or flange 36 overlying a radially outwardly projecting flange 37 on the orifice block 26. The threads 34 and the spring 23 accommodate vertical adjustment of the orifice block and sleeve.

The internal bore 28 of the sleeve 22 in cooperation with the interior passage 27 of the orifice block 26 defines an interior chamber B which communicates with the outlet passage 13 of the plasticizer-extruder 11 to receive plasticized material A therefrom. Interposed in the passage 13 is a rotary cut-off valve 40, one such valve being provided for each forming station 18 and the valves 40 preventing communication of the material filling the chamber B with the plasticizer-extruder 11 when positioned as shown in FIG. 2 of the drawings. Thus, the valves 40 serve to confine material A in the chambers B, the chambers B being in communication with the open overlying orifices 30.

At each of the forming stations 18, there is provided a neck mold 41, such neck molds each comprising separable mold halves 42 cooperably defining an interior mold space 43 having an interior surface conforming to the desired finish of the bottle. The separable neck mold halves 42 are mounted for vertical displacement on a vertically movable head 44 adapted to be raised and lowered relative to the orifice 30 by suitable means, as by a fluid actuated cylinder 45 having a piston 46 secured to the head 44.

Projecting centrally of each of the neck molds 41 is a neck mold mandrel 47 having a lower portion 48 defining the interior surface of the neck or injection mold 41 and having an axial bore 49 through which a subsequently extruded tube can be blown, as will be hereinafter more fully described. The lower surface 50 of the neck mold mandrel 47 abuts the free upper surface of an orifice mandrel 51 coaxial with the sleeve 22 and secured thereto for vertical movement therewith, as by laterally projecting flanges 52 secured to the sleeve 22. The orifice mandrel 51 is of variant radial dimension along its length and cooperates with the surrounding sleeve 22 to provide a tortuous flow path of alternately increasing and decreasing cross-sectional area to insure the delivery of plasticized material A to the orifice 31 in a direction substantially completely axially thereof and without eddy currents or other disturbances therein.

In the operation of the present invention, the relative starting positions of the various apparatus components is best shown in FIG. 2 of the drawings, i.e., with the neck mold 41 contacting the upper surface of the orifice plate 26 and with the orifice plate 26, the sleeve 22 and the mandrel 51 in their uppermost positions under the influence of the spring 23 holding the flanges 36 and 37 in abutment. The chamber B underlying the orifice is completely filled with material A from the previous cycle, and the valve 40 is in its illustrated closed position to confine the material A in the chamber B.

Figure 3:
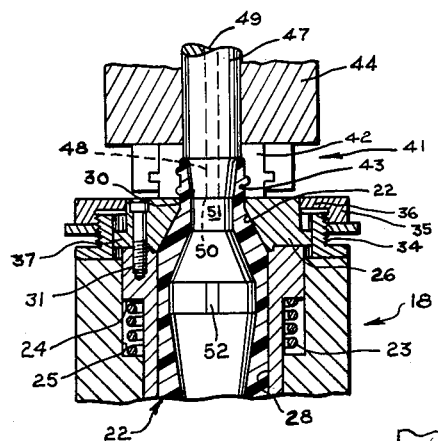
FIG. 3 is a view similar to FIG. 2 illustrating the apparatus in adjusted position while carrying out the method.

The next step in the method is best illustrated in FIG. 3 of the drawings wherein the cylinder 45 is actuated to depress the neck or injection mold 43 relative to the chamber B and concurrently moving the orifice plate 26, the sleeve 22 and the mandrel 51 downwardly with the neck molds 41 and the mandrel 48. Such movement is accommodated by compression of the spring 23 and by movement of the orifice plate flange 37 downwardly from abutment with the overlying flange 36 on the nut 35.

Such downward movement necessarily reduces the volume of the chamber B and expresses material A under pressure therefrom through the orifice 30 into the mold space 43, thereby injection molding the portion of the article defined by the injection mold, the injection pressure necessarily being determined by the extent of reduction of the volume of the chamber B.

Figure 4:
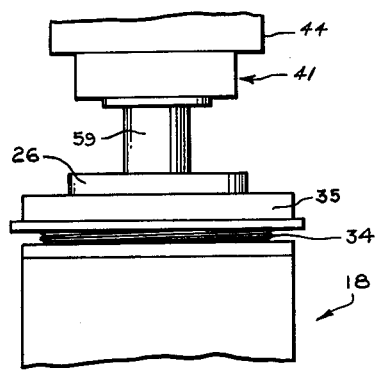
FIG. 4 is an elevational view similar to FIG. 5 illustrating a subsequent step in the method.

Once the desired injection pressure has been attained and the mold space 43 has been filled, the cylinder 45 can again be actuated in a reverse direction to withdraw the head 44, the injection mold sections 42 and the mandrel 47 from the position of FIG. 4 to the initial or starting position of FIG. 2. This movement, of course, increases the volume of the chamber B and, to prevent cavitation within the chamber B and within the neck mold, valve 40 is opened so that material under pressure can be supplied to the chamber B through the supply passage 13.

Figure 5:
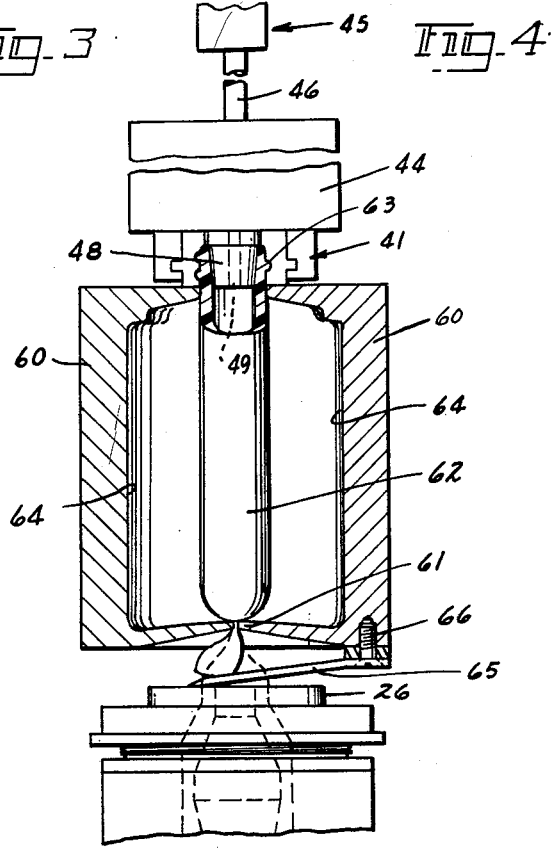
FIG. 5 is a fragmentary view, with parts in section, illustrating the enclosure of the extruded tube within a sectional blow mold.

During retraction of the head 44 upwardly, the spring 23 will insure following movement by the orifice plate 26, the sleeve 22 and the mandrel 51 until flange 37 again abuts flange 36. Thereafter, vertically upward retraction of the neck mold 41 will allow the extrusion of material from chamber B through the orifice 30 as an unconfined cylindrical tube 59 as best illustrated in FIG. 5, this tube having its upper or leading end formed by the material filling the injection mold.

After a tube of the proper length to form the remainder of the article has been extruded, a pair of separable blow mold halves 60 (FIG. 6) are closed on the extruded tube 59 and intermediate the neck mold 41 and the orifice plate 26. These blow mold sections 60 are provided with lower portions 61 engageable with the tube in spaced relation to the orifice plate 26 to pinch the tube shut, thus forming the tube 59 into a closed bag 62 in communication, through the injection molded portion 63 thereof, with the blow passage 49 in the neck mold mandrel 48. On the introduction of blow air under pressure through the passage 49, the bag 62 will be expanded into contact with the walls of the blow mold sections defining the cavity 64. At the time of closure of the blow mold sections onto the tube, the orifice 30 is wiped and the tube is severed from it by a cutting element 65 secured, as at 66, to one of the blow mold sections. After extrusion of the tube is completed, the valve 40 is again moved to its closed position of FIG. 2.

After blowing and cooling of the bag 62 in the closed blow mold sections 60, the blow mold sections are opened, the neck mold sections 42 are separated and the finished article is removed from the machine. Next, the cylinder 45 is actuated to lower the head 44 to its position illustrated in FIG. 2 of the drawings and the injection molding, extrusion and blowing process can now be repeated.

Thus, it will be seen that the present invention provides an apparatus and method wherein simple relative movement between an injection mold (defined by the separable neck mold sections 42 and the neck mold mandrel 47) and a confined body of plastic material (in the chamber B) is utilized to injection mold a portion of an article. Subsequently, a tube is extruded integral with the injection molding portion, and this tube is later blow molded to finish the article. The simplicity, ease of operation, and commercial desirability of the disclosed apparatus will be readily appreciated.

The operational advantages and continuous sequence of steps will be evident. The depression of the mold for injecting material into the mold space and the utilization of the upward return of the orifice structure with the mold to provide the setting time for the injected material materially reduces the overall cycle time. There is no necessity of awaiting cam actuation or timer operation during any of the injection and setting period.

Having thus described my invention, I claim:

1. In a method of making a plastic article by blowing a tube extruded through an orifice, the steps of confining a body of plastic material in a chamber of predetermined volume in communication with the orifice, positioning an injection mold over the orifice and in communication therewith, linearly displacing the mold and the orifice in one direction to reduce the volume of said chamber and to force material under pressure determined by the degree of displacement into said injection mold, linearly displacing the filled mold and the orifice in the opposite direction while feeding additional plastic material to the chamber from the extruder to maintain the chamber filled, halting the orifice when it attains its original position and said chamber is of said predetermined volume, continuing linear displacement of said mold to separate the mold from the orifice and to extrude through the orifice a tube joined to the material filling the mold, enclosing the extruded tube only in a blow mold and blowing the tube within the mold.

2. In a method of making a plastic article by blowing a tube extruded through an orifice from a body of plastic material communicating with the orifice and of predetermined initial volume, the steps of superimposing an injection mold over the orifice for communication therethrough with the body of plastic material, jointly moving the mold and the orifice in one direction to force material from said body under pressure generated by mold movement into said injection mold, jointly returning the filled mold and the orifice to their original positions while feeding additional plastic material to the body from the extruder as the volume of the body increases, halting the orifice when the body volume is the same as said predetermined initial volume, and thereafter moving the mold only away from the orifice while extruding through the orifice a tube integral with material filling the mold.

3. In a method of making a plastic article or the like by a combined injection molding, extrusion and blowing process, the improvement of injection molding an annular portion only of the article by the steps of confining in an annular chamber a body of plasticized material of predetermined volume communicating with an annular injection mold through an orifice defined by concentric orifice plate and mandrel elements, jointly moving the mold and the orifice-defining elements relative to the body of material to materially reduce the volume of the body and to fill the mold with material expressed through the orifice at a pressure determined by the degree of volume reduction, concurrently subsequently returning the filled mold and the elements to their initial positions while adding material to said body, halting the orifice-defining elements, and moving the mold from the orifice while continuing to express material through the orifice to extrude a tube joined to material in the mold.

4. In a method of making a plastic article by blowing a tube extruded through an annular, multi-part orifice, the steps of providing a body of plastic material, positioning an injection mold in contact with the orifice to communicate therethrough with the body of plastic material, jointly displacing the mold and the orifice relative to the body of material to force material from said body under pressure through the displaced orifice into said injection mold, jointly returning the filled mold and the orifice to their original positions relative to the body while feeding additional plastic material to the body from the extruder to maintain the volume of the body, further moving said mold relative to the orifice and said body while extruding from said body through the stationary orifice a tube joined to the material filling the mold, interposing a blow mold between said injection mold and said orifice to enclose the tube therein, and blowing the tube within the mold.

5. In an apparatus for making a plastic article; means defining a chamber of variable volume for containing a body of plasticized material, said means including an orifice plate defining one wall of the chamber and having an opening therein, a mandrel concentric with the plate opening and means accommodating joint movement of the orifice plate and the mandrel to reduce and increase the chamber volume; a conduit for supplying material to the chamber; movable valve means in said conduit for movement to alternatively accommodate material flow to the chamber and to entrap material therein; an injection mold having an exterior wall abutting the orifice plate and co-movable therewith; a mold core for said injection mold abutting the orifice mandrel and co-movable therewith; means for jointly linearly displacing the mold including the core, the mandrel and the orifice plate to reduce the volume of the chamber and to force entrapped material intermediate the orifice plate and the mandrel into said mold; and means for jointly returning the mold including the core, the mandrel and the orifice plate to their initial positions to restore the original volume of the chamber with the valve means positioned to accommodate the supply of material to said chamber through said conduit.

6. In a method of making a plastic article or the like by a combined injection molding, extrusion and blowing process, the improvement of injection molding a portion only of the article with plasticized material from a body of such material of predetermined volume in communication with an injection mold, and including the steps of moving the mold in a first direction relative to the body of material to materially reduce the volume of the body and to fill the mold with material, subsequently moving the mold in a second reverse direction to return the filled mold to its initial position while adding sufficient material to said body to restore the initial volume thereof, and continuing to move the filled mold in the second direction beyond its initial position while dispensing material from said body as an extruded shape continuously joining said body to the filled mold.

7. In an apparatus for making a plastic article, means including an orifice plate defining a chamber of variable volume for containing a body of plasticized material, material in said chamber communicating with the atmosphere through an orifice in said plate, means for supplying plasticized material to the chamber, a mold abuttable with said orifice plate and in communication with the orifice, a head carrying the mold and linearly movable in opposite directions, means for moving the head toward the chamber to jointly move the mold and the plate, such movement toward the chamber reducing the volume of the chamber to force material into said mold, means for moving the head away from the chamber in two stages (1) to return the mold to its initial position and (2) to move the mold beyond its initial position while accommodating extrusion of a tube through the orifice integral with material filling the mold, and means for preventing movement of the plate with the mold as the head moves away from the chamber in its stage 2 movement, so that extrusion of the tube occurs through the plate orifice.

References Cited in the file of this patent

UNITED STATES PATENTS

| | | |
|---|---|---|
| 2,344,176 | Shaw | Mar. 14, 1944 |
| 2,804,654 | Sherman | Sept. 3, 1954 |

FOREIGN PATENTS

| | | |
|---|---|---|
| 551,468 | Great Britain | Feb. 24, 1943 |
| 635,991 | Great Britain | Apr. 19, 1950 |
| 799,672 | Great Britain | Aug. 13, 1958 |